March 23, 1926.

H. W. CHURCH 1,578,111

INTERNAL COMBUSTION ENGINE

Filed Dec. 13, 1924

Inventor

Henry W. Church

By

Attorneys

March 23, 1926.
H. W. CHURCH
INTERNAL COMBUSTION ENGINE
Filed Dec. 13, 1924  3 Sheets-Sheet 3
1,578,111
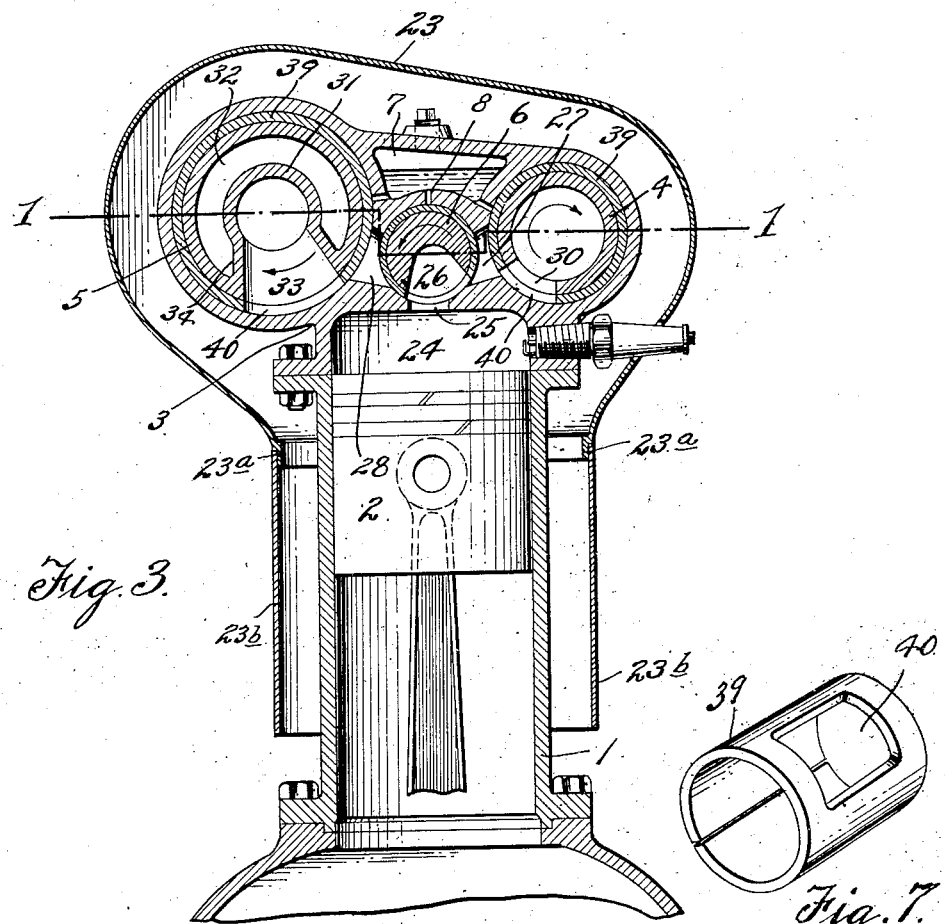
Fig. 3.
Fig. 7.
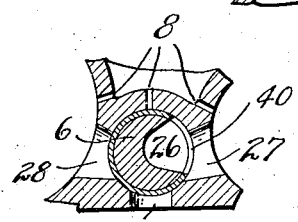
Fig. 4.
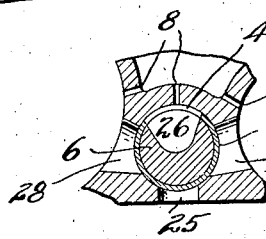
Fig. 5.
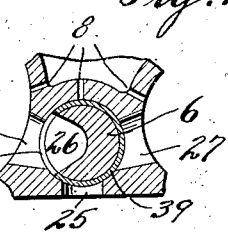
Fig. 6.
Inventor
Henry W. Church
By
Attorneys Patented Mar. 23, 1926.

1,578,111

UNITED STATES PATENT OFFICE.

HENRY W. CHURCH, OF HIGHLAND PARK, MICHIGAN; EDWARD P. WRIGHT ADMINISTRATOR OF SAID HENRY W. CHURCH, DECEASED.

INTERNAL-COMBUSTION ENGINE.

Application filed December 13, 1924. Serial No. 755,663.

*To all whom it may concern:*

Be it known that I, HENRY W. CHURCH, a citizen of the United States, residing at Highland Park, in the county of Wayne and State of Michigan, have invented certain new and useful Improvements in Internal-Combustion Engines, of which the following is a specification, reference being had therein to the accompanying drawings.

Internal combustion engines have been provided with rotary valves for controlling the inlet of combustible charges and the exhaust of gases from the cylinders, but it has been found that these valves as ordinarily constructed are not reliable in their operation for the reason that they are usually directly exposed to the extreme heat generated by the explosion of gases in the cylinders. This extreme heat prevents proper lubrication and causes an expansion of the valves to such an extent that they stick in their seats and proper operation is prevented. These rotary valves as usually constructed are provided with ports or openings through which the charges are admitted to the cylinder and the exhaust gases are discharged, and it has always been found difficult to seal these openings so that leakage and consequent loss of compression within the cylinders will be prevented. Difficulty has also been experienced in properly lubricating such valves and in providing proper cooling of the walls of the valves and the cylinders, and the arrangement of valves has often been such as to necessitate excessive speeds of rotation with consequent generation of heat and trouble arising therefrom.

The present invention relates to internal combustion engines of the rotary valve type, and has for its objects to simplify and cheapen construction, insure free operation of the valves, afford protection to the valves against high compression and direct exposure to the heat of combustion, and insure against leakage and consequent loss of compression in the cylinders. A further object is to provide an arrangement whereby free expansion of the rotary valve is permitted, thus obviating the sticking of the valve in its seat, and also to provide against loss of compression in the cylinder due to leakage around the openings in the valve, and further to provide an arrangement whereby a compact and efficient drive is provided for rotating the valve or valves in timed relation to piston reciprocation and thorough lubrication of the valve and its driving mechanism is insured. It is also an object to provide an arrangement of rotary valve whereby the exhaust from the engine is controlled and the sound of such exhaust deadened, thus obviating the necessity for an exhaust muffler, and to also provide an arrangement embodying certain other new and useful features, all as hereinafter more fully described.

With the above and other ends in view the invention consists in providing a rotary intake valve and a rotary exhaust valve, with a rotary closure member interposed between these valves and the engine cylinder or cylinders to prevent the exposure of the inlet and exhaust valves to the direct heat of combustion within the cylinder and to insure against leakage of compression past or through these valves. The invention also consists in an arrangement whereby thorough lubrication of the rotary valve and closure member is effected and a simple and convenient means provided for directing a current of air around the casing enclosing these members, and around the walls of the engine cylinders. The invention further consists in an arrangement whereby a simple and efficient drive mechanism is provided for rotating the valves and closure member in timed relation to the reciprocation of the pistons in the cylinders and thorough lubrication of this drive mechanism is secured. The invention also consists in an arrangement of rotary valves and drive mechanism whereby a slow rotary speed of the valves is obtained, and in providing a construction of expansion ring for the valves whereby leakage and consequent loss of compression is prevented. The invention also consists in the construction and arrangement whereby certain other new and useful features are secured, all as hereinafter more fully set forth and particularly pointed out in the appended claims, reference being had to the accompanying drawings, in which Figure 1 is a horizontal longitudinal section through the head of an engine substantially upon the line I—I of Fig. 3 and illustrative of the present invention, showing rotary valves partly in section and partly in elevation;

Fig. 3 is a transverse vertical section through one of the cylinders and head;

Figs. 4, 5 and 6 are cross sectional details of a rotary cylinder closure member showing the same in the different positions of its operation relative to the operating strokes of the engine piston in its cylinder; and Fig. 7 is a perspective detail of a packing ring.

Figure 1:
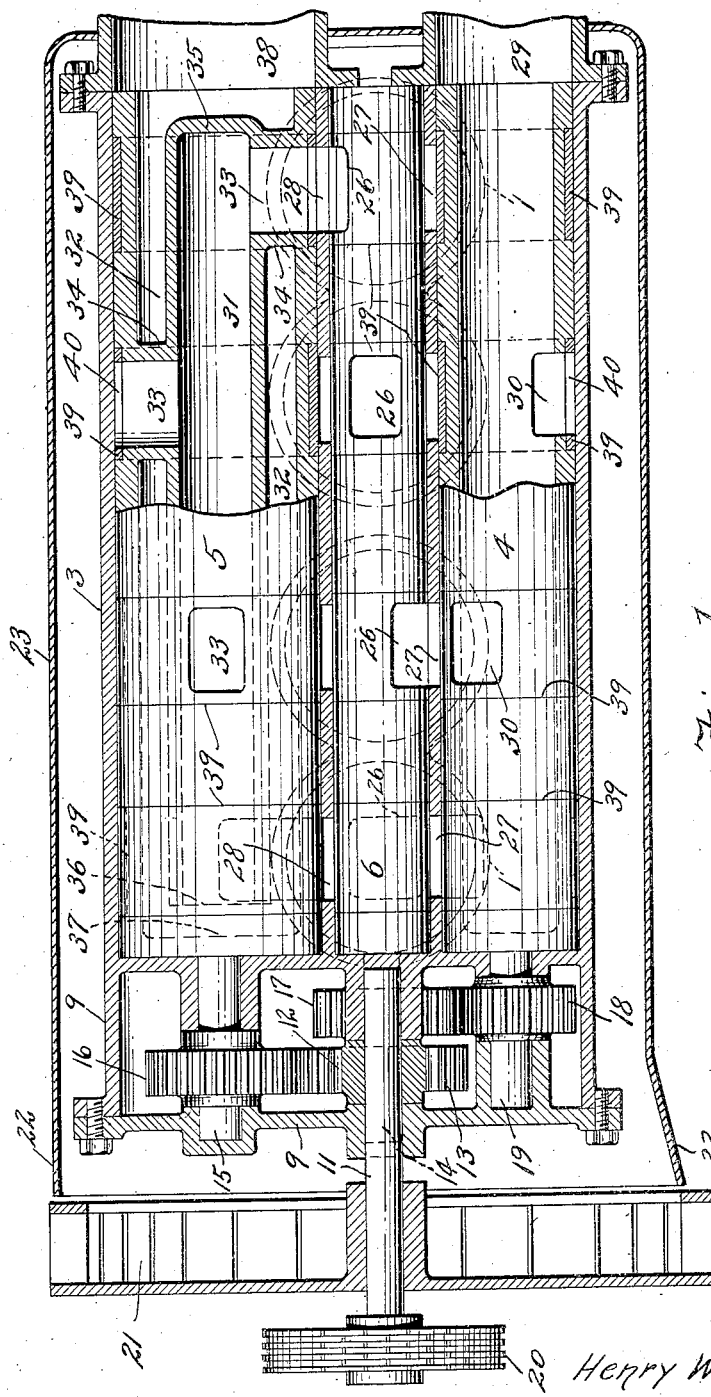
Figure 2:
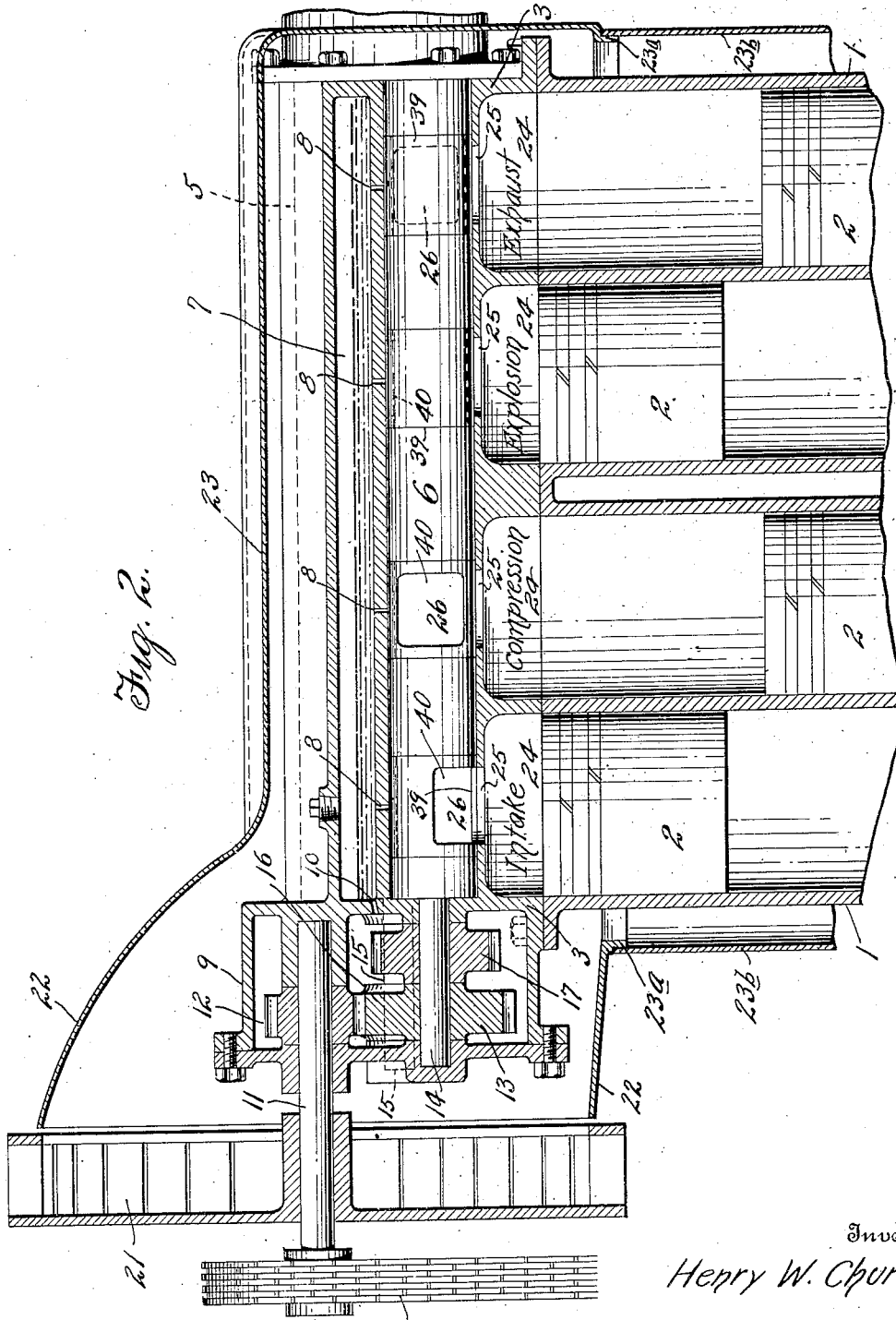
Fig. 2 is a longitudinal vertical section through one of the cylinders and head of the engine and showing a rotary closure member in elevation and oil and gear chambers in section.

In the drawings, 1 indicates the several cylinders of the engine, which cylinders are preferably cast en bloc, and 2 indicate the usual pistons in said cylinders.

Secured upon and closing the upper ends of the cylinders is a head 3, which head is provided with three longitudinal bores, one to receive the rotary inlet valve 4, another to receive the rotary exhaust valve 5 which is spaced from the valve 4, and the third bore is provided to receive a rotary closure member 6 located between the valves 4 and 5 and directly above the several cylinders in the plane of the axes thereof. The head 3 is also formed with a longitudinal oil chamber 7 between the valves 4 and 5 and directly above the member 6. This chamber extends the full length of the head and communicates at different points with the bores for the valves 4 and 5 and member 6 through small holes or passages 8 provided in the wall of the chamber.

A gear casing 9 is formed integral with or otherwise secured to one end of the head 3, and this gear casing also communicated with the oil chamber 7 through small openings 10. Within suitable bearings on the casing 9 is mounted a short drive shaft 11 located directly above the longitudinal axial plane of the member 6, and secured upon this shaft is a small gear 12 in mesh with a gear 13 secured upon a trunnion 14 projecting from the end of the member 6 in the casing.

Rotation is transmitted to the stud or trunnion 15 on the end of the rotary exhaust valve 5 by means of a gear 16 which is in mesh with the gear 13, and in a like manner motion is transmitted to the rotary inlet valve 4 by means of a gear 17 also secured on the trunnion 14 and in mesh with a gear 18 secured upon the trunnion 19 which projects into the casing from the end of the rotary inlet valve 4.

Rotary motion is imparted to the shaft 11 by means of a sprocket chain 20 engaging a sprocket wheel on the extreme outer end of the shaft, said chain preferably engaging a sprocket wheel on the end of the engine crank shaft, not shown.

Secured to the driving shaft 11 between the chain 20 and the outer end of the casing 9, is a fan wheel 21 which is located at the open bell-shaped end of a fan casing 22 forming a continuation of a casing 23 which encloses the head 3 of the engine and is flanged at its lower side as at 23$^a$ to fit over the open upper ends of sleeves or jackets 23$^b$ surrounding the several cylinders and spaced from the walls of the cylinders, with the lower ends of these jackets open. These jackets may be in the form of separate tubular members secured together at their meeting points between the several cylinders, or may be formed of a continuous wall as shown, which surrounds the several cylinders or the entire block of cylinders. With this arrangement air is drawn into the forward end of the casing 22 by the fan 21 and forced by the fan through the casing 23 over and around the head of the engine, and from this casing downwardly through the jacket 23$^b$ surrounding the cylinders, and thence out through the open lower end of the jacket, the rear end of the casing 23 being closed. Efficient air cooling of the entire engine is thus secured by forcing a current of air into the casing surrounding the head, and from this casing downwardly around the cylinders to cool the walls thereof, an efficient air cooled motor being thus provided by this arrangement.

At the vertical axis of each cylinder 1, within the wall of the head which forms the combustion chamber 24 of the cylinder, is provided a single port 25 which affords the only passage to or from each cylinder, and this port opens into the bore which forms the seat for the rotary closure member 6. This rotary closure member is formed with a single recess 26 to register with the port 25, there being a recess to register with each of the ports for each of the cylinders. The head 3 is also formed adjacent each combustion chamber 24 with an inlet passage 27 affording communication between the bore for the member 6 and the bore for the rotary inlet valve 4, and a similar passage 28 connects the bore for the member 6 with the fore for the rotary exhaust valve 5. The member 6 thus controls communication between both the valves 4 and 5, with the interior of the cylinder, and the arrangement of the chamber 26 in this rotary closure member 6 is such that during the compression and firing strokes of the piston in the cylinder, the port 25 is positively and effectually closed and both rotary valves 4 and 5 are thus protected from exposure to the extreme heat of the combustion within the firing chamber of the cylinder.

The rotary inlet valve 4 is of tubular form, with its inlet end open and in communication with a suitable pipe or conduit 29 (Fig. 1) leading to the carbureter (not shown) of the engine. The opposite end of the valve 4 is closed and provided with the stud or trunnion 19 by means of which it is rotated, and ports 30 are provided in this valve to register with the passages 27, there being one port to register with each passage, and these ports being arranged in angular relation to each other to open communication with its cylinder and admit charges thereto in proper timed relation to the movements of the piston in that cylinder, the arrangement of these ports corresponding to the arrangement of the chambers 26 in the member 6, so that when the port 30 is in registry with its passage 27, the corresponding chamber 26 will also be in registry with the passage and with the corresponding port 25, so that charges will be admitted to the several cylinders in proper timed relation to the movements of the pistons in the cylinders.

The rotary exhaust valve 5 is also of hollow tubular form, and has an axial center tube 31, the wall of which is spaced from the outer wall of the valve to provide an annular exhaust passage 32, and ports 33 are provided in the valve to provide communication between the exhaust passages 28 and the center tube 31, these ports being arranged in angular relation to each other, so that the passage 28 when opened by the member 6 to permit the exhaust gases to escape from a particular cylinder and permit the escaping gases to pass through the port 33 and out through the tube 31, the exhaust valve being rotated in timed relation to the rotation of the member 6 and the reciprocation of the piston in the cylinder, to cause such registration of the port with its passage 28 and with the chamber 26 at the proper time.

The several ports 33 are formed in neck portions 34 which connect the center tube 31 with the outer wall of the valve and thus said center tube is supported by these neck portions at the axis of the valve. The rear end of the tube 31 is closed as by the wall 35, and the front end of this tube is open as at 36 (Fig. 1) and spaced from the front end wall 37 which closes the front end of the valve 5, and which has formed integral therewith the trunnion 15, by means of which the valve is rotated. The exhaust gases escaping from the several cylinders thus enter the center tube 31 and are directed toward the forward closed end of the valve, escaping from the open forward end of the tube into the forward end of the annular passage 32 and passing rearwardly therein, escape through a suitable exhaust pipe 38 secured to the rear end of the head over the open rear end of the valve 5.

In order to seal the valves 4 and 5 and the rotary member 6 around the ports and chambers in these valves and member, a split packing ring 39 is provided, a single ring being mounted upon each valve and member at each of the ports or recesses therein. This packing ring as shown in Figure 7 is in the form of a split spring tubular member of greater length than the length of the port or opening in the valve or member to which it is applied, and this ring is formed with an opening 40 equal in area to the port or chamber in the valve or member, so that the ring completely surrounds the port and tightly engages the wall of the bore or seat in which the member or valve rotates to prevent leakage around the valve from the port, each valve and member being exteriorly grooved or recessed slightly to receive the packing ring.

As usually constructed, a split packing ring is provided at each end of the port in the valve, but these rings seal the port only at its ends, while with the present arrangement of a single split packing ring having an opening therein of the same area as the area of the port, seals the port on all sides and effectually prevents leakage.

With the present arrangement of the rotary closure member 6 which is interposed between the cylinder and its rotary inlet and exhaust valves, the heat of combustion within the cylinder is prevented from reaching the valves, and as any leakage from the cylinder must pass not only the member 6, but also both inlet and exhaust valves, these valves and member may be constructed to fit comparatively loosely in their bores, thereby insuring against the sticking of these valves in their seats and insuring the free rotation of the closure member. The arrangement of the head 3 also provides an oil chamber, and this oil chamber through restricted openings is in constant communication with the bores of the rotary valves, and also of the rotary member 6, so that a complete and thorough lubrication is secured and the arrangement of gear casing at the end of the head provides ample lubrication for the gearing by providing communication between the oil chamber and the gear casing. Oil may be supplied to the oil chamber in any suitable manner not shown.

The arrangement of head provided with the several rotary members for controlling the inlet of charges to the several cylinders and the exhaust of gases therefrom, provides a very simple and compact arrangement which lends itself particularly to the application thereto of a casing through which air may be forced to not only efficiently cool the head, but also to cool the several cylinders and thus obviate the necessity for forming the cylinders and head with a water jacket.

It is obvious that the size and arrangement of the rotary valves and rotary control member intermediate these valves and the several cylinders, may be changed to suit the design of engine, and that other changes may be made within the scope of the appended claims without departing from the spirit of the invention. I do not, therefore, limit myself to the particular construction and arrangement shown.

Having thus fully described my invention, what I claim is:—

1. In an internal combustion engine, the combination with a cylinder and a piston therein, said cylinder having a head, of a rotary valve carried by the head, said head being provided with a passage controlled by said valve and opening into said cylinder, and a rotary member controlling said passage intermediate said valve and cylinder.

2. In an internal combustion engine, the combination of a cylinder having a head provided with a single port for the inlet of combustible charges to the cylinder and the escape of exhaust gases therefrom, said head being also provided with seats for a rotary intake valve and a rotary exhaust valve, rotary valves engaging said seats, and a rotary member controlling communication between said seats and said port.

3. In an internal combustion engine, the combination of a cylinder having a head provided with bores to receive rotary valves and formed with passages leading from said bores to a single common port opening into the cylinder, rotary valves in said bores, and a rotary member controlling said passages and communication between said bores and cylinder through said port.

4. In an internal combustion engine, the combination of a cylinder having a head provided with bores spaced apart laterally of the cylinder and an intermediate bore with passages connecting said bores and a single port opening into said cylinder and intermediate bore, rotary valves in said spaced apart bores, a rotary control member in said intermediate bore having a recess to effect communication alternately during its rotation between said port and said passages.

5. In an internal combustion engine, the combination of a cylinder head formed with spaced apart longitudinal valve bores opening through the ends of the head and an intermediate bore for a rotary closure member, said head being formed with passages connecting said bores and ports opening into said intermediate bore, tubular rotary valves in said spaced apart bores and each formed with a closed end provided with a stud and an open end, a gear casing at one end of the head into which the studs project, gears within the gear casing on said studs, pipes secured to the opposite end of said head, one to conduct combustible charges to one of said valves and another to conduct away the exhaust gases from the other valve, a rotary closure member in said intermediate bore and formed with chambers to alternately connect said passages with said ports, a stud on one end of the rotary closure member, a gear on said stud, and split packing rings on the rotary closure member, each having an opening therein to register with a chamber in the member and provide a seal surrounding the opening of the chamber through the side of the member.

6. In an internal combustion engine, the combination with a series of cylinders and pistons therein, of a head for said cylinders formed with longitudinal bores spaced apart laterally of the cylinders and an intermediate longitudinal bore between said spaced apart bores, said head being also formed with passages connecting said spaced bores with said intermediate bore and ports, one for each cylinder, opening into said intermediate bore, said head being formed with an oil chamber above said intermediate bore and between said spaced bores and having restricted communication with all of said bores to supply lubricant thereto, tubular rotary valves in said spaced bores, said valves being closed at one end and open at the opposite end, split packing rings on said valves, each having an opening to register with a lateral opening in the valve to which the ring is applied, a rotary closure member in the intermediate bore and having recesses therein to alternately register with said passages and ports in the head, a gear casing at one end of the head, a shaft mounted in bearings in said casing, and gears in said casing for transmitting motion from said shaft to said valves and closure member.

In testimony whereof I affix my signature.

HENRY W. CHURCH.